Figure 1:
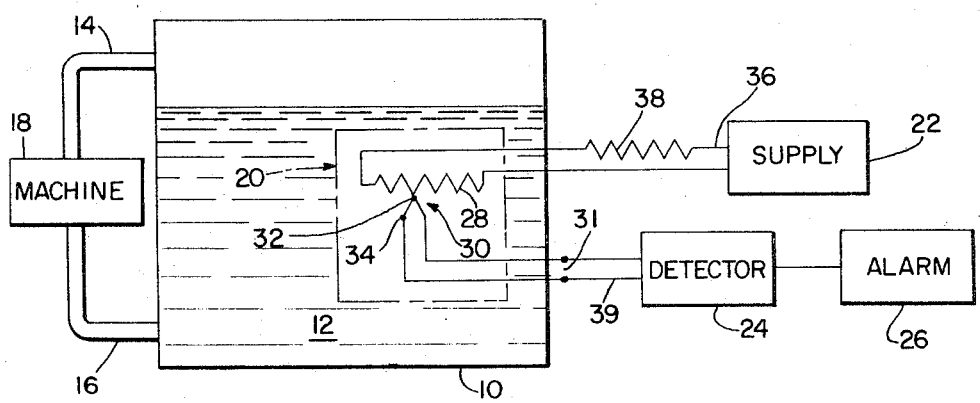

Jan. 31, 1967  S. B. WILLIAMS ETAL  3,301,055

THERMOELECTRIC FLUID SENSOR

Filed May 28, 1965  2 Sheets-Sheet 1

INVENTORS
SIDNEY B. WILLIAMS
VERNON C. WESTCOTT
BY
Blair & Buckles
ATTORNEYS

INVENTORS
SIDNEY B. WILLIAMS
VERNON C. WESTCOTT
BY
*Blair & Buckles*
ATTORNEYS

United States Patent Office

3,301,055
Patented Jan. 31, 1967

3,301,055
THERMOELECTRIC FLUID SENSOR
Sidney B. Williams, Lexington, and Vernon C. Westcott, Lincoln, Mass., assignors to Trans-Sonics, Inc., Lexington, Mass.
Filed May 28, 1965, Ser. No. 459,793
27 Claims. (Cl. 73—295)

This application is a continuation in part of application Serial Number 384,980 filed July 24, 1964, and now abandoned.

This invention relates to thermoelectric apparatus for determining whether a stored liquid is above or below a known level. More particularly, the invention relates to a thermoelectric liquid sensor of the type having an electric heater. The sensor is constructed in a novel manner to have an output signal in which the level-dependent, information component is relatively large with respect to the noise component due to the heater voltage. As a result, the level-dependent output signal can be readily distinguished from the heater voltage appearing at the output terminals.

The sensor can be heated entirely by means of Joule heating. However, in accordance with a further feature of the invention, it is advantageously construed to employ Peltier heating in place of at least some of the Joule heating. The Peltier heat is confined to more closely the point where it is needed. Moreover, Peltier heating develops a larger temperature change per unit of electrical excitation than does Joule heating.

The sensor is rugged, compact, and reliable. It is particularly suited for locating liquid levels in inaccessible containers and under widely varying pressures, temperatures and mechanical stresses.

Reliable indication of the presence of a liquid at a given level is a necessity in many present-day machines. For example, satisfactory operation of an aircraft engine often depends on an adequate supply of lubricating oil in an oil reservoir. A sensor for the engine oil must withstand the high temperature the oil attains during normal operation as well as the high altitude and the mechanical shock and vibration that aircraft encounter.

One technique for indicating whether a monitored liquid is above a known level utilizes the different thermal diffusivities of the liquid and of the fluid above it. A sensor employing this technique has a temperature-responsive transducer heated with an electric resistance element and disposed in the liquid-containing vessel. Because of the different thermal diffusivities, the liquid removes heat from the transducer at a rate different from the fluid above it. Accordingly, the temperature of the transducer, and hence its output signal, has a first value when the monitored liquid is above the transducer and a different, second value when the liquid is below the transducer.

However, with prior sensors in which the transducer is a thermocouple, the output signal often includes a portion of the heater voltage. Moreover, the amplitude of the heater voltage appearing at the thermocouple output terminals can be substantial when compared to the liquid level-dependent output signal.

As a result, prior sensors of this type involve a considerable amount of additional apparatus and, correspondingly, additional expense and bulk, to separate the heater voltage from the level-dependent output. For example, with one prior arrangement the sensor develops the level-dependent output signal between terminals that are balanced with respect to the heater voltage so that no heater voltage appears at the output terminals. Such additional apparatus is particularly undesirable in a sensor for monitoring fluid at a single level.

It is an object of the present invention to provide an electrically-heated temperature-responsive fluid level sensor that develops an output voltage having a fluid level-dependent component readily distinguishable from other components. More particularly, it is an object that the fluid level-dependent component of the sensor output signal be readily distinguishable from the output component produced by the heater voltage.

Another object of the invention is to provide such a sensor having highly efficient heating, thereby minimizing the electrical power required.

A further object of the invention is to provide apparatus of the above type for determining whether a stored liquid is above a known level and which is characterized by high reliability.

Another object of the invention is to provide fluid level-sensing apparatus of the above type for operation in adverse environments. A more particular object is that the apparatus be accurate at extremes of pressure, temperature and mechanical stress.

It is also an object of the invention to provide liquid-sensing apparatus of the above type that has a light weight and small size. Attaining these objects is particularly desirable for use in air and space craft.

A further object of the invention is to provide a reliable and accurate liquid sensor that has simple construction.

Other objects of the invention will in part be obvious and will in part appear hereinafter.

The invention accordingly comprises the features of construction, combinations of elements and arrangement of parts exemplified in the construction hereinafter set forth, and the scope of the invention is indicated in the claims.

Figure 2:
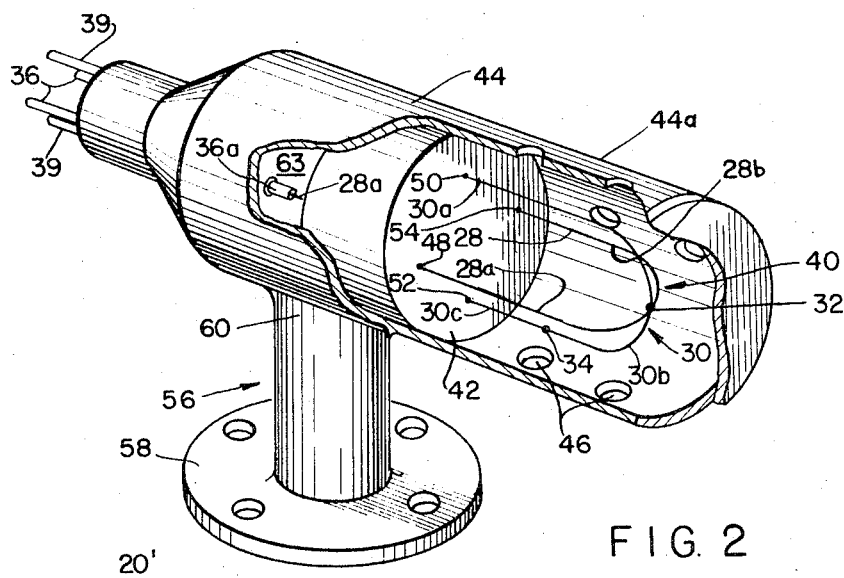
Figure 3:
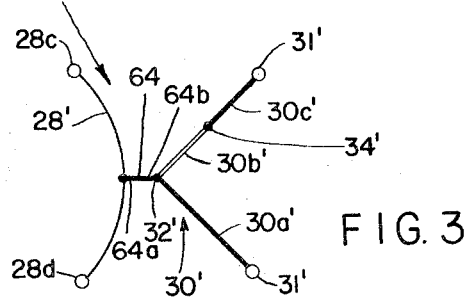
Figure 4:
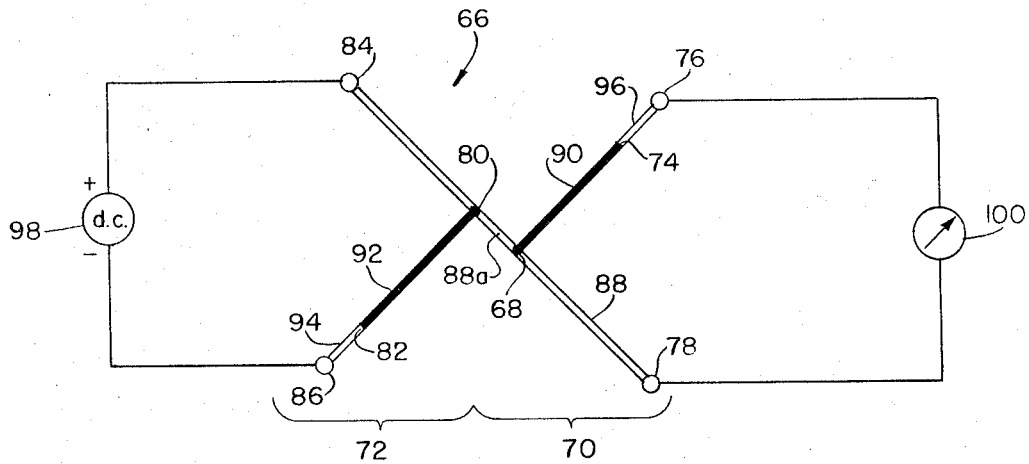
Figure 5:
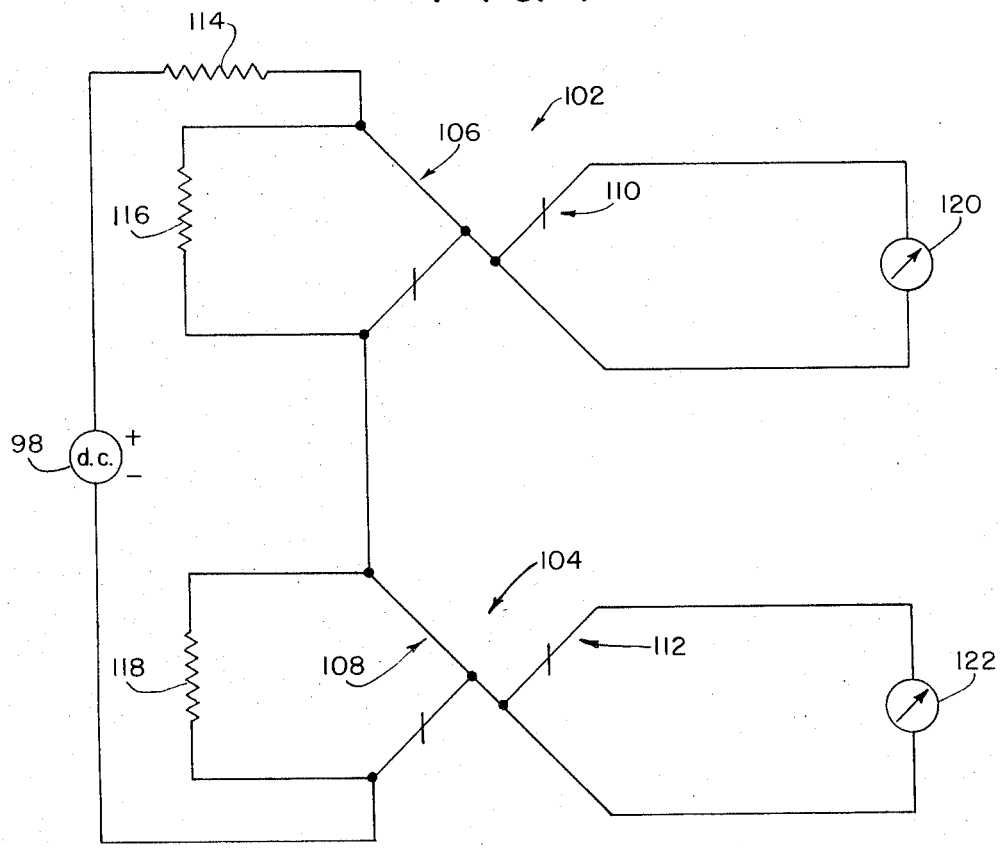

For a fuller understanding of the nature and objects of the invention, reference should be had to the following detailed description taken in connection with the accompanying drawings in which:

FIG. 1 is a schematic representation, partly in block form, of a liquid level indicating system embodying the invention, FIG. 2 is a perspective view, partly broken away, of a thermoelectric sensor embodying the invention, FIG. 3 is a diagrammatic representation of another thermoelectric sensor embodying the invention, FIG. 4 is a diagrammatic representation of a thermoelectric sensor employing Peltier heating, and FIG. 5 is a schematic representation of a circuit for energizing two sensors according to the invention.

In brief, the thermoelectric sensor has a thermocouple sensing junction integral with an electric heater. Alternatively, the sensing junction is closely spaced from the electric heater but still electrically in circuit with it.

A second junction of the thermocouple, a "cold" junction, is removed from the heater but disposed to be submerged together with the heated junction and the heater. With this construction, the output voltage when the liquid level is above the thermocouple is different from the output voltage when the liquid level is below it. Specifically, the thermal diffusivities of most liquids are sufficiently high to maintain both junctions at the same temperature when the sensor is submerged. On the other hand, air has a much lower diffusivity and hence, when the liquid level falls below the sensor, the heated or sensing junction retains heat from the heater so that its temperature rises above the temperature of the cold junction.

In one embodiment, the sensor has the heater integral with the thermoelectric sensing junction. This intimate relationship of the heater and junction provides for high heat transfer and hence results in highly efficient heating. More particularly, the sensor is constructed with a substantially point contact between the sensing junction and the heater. Consequently, the heater supply voltage developed in the thermocouple circuit is small relative to liquid level-dependent changes in the thermoelectric voltage. Such voltage changes occur when the liquid level rises to immerse, or drops to expose, the thermocouple junctions. As a result, the liquid level-dependent voltage at the output of the sensor is readily distinguishable from the heater voltage.

In another embodiment of the invention, the heater voltage present at the sensor output terminals is of even lesser amplitude and has relatively no effect on the level-dependent output.

A further embodiment of the invention incorporates an additional pair of thermoelectric junctions to provide Peltier heating for the sensing junction. The Peltier heating, generally combined with resistive, i.e. Joule, heating, making possible a further increase in the efficiency of the sensor.

A further feature of the present sensor is that the cold junction of the fluid-sensing thermocouple is arranged to be at the same temperature as the fluid surrounding the sensor. This is in contrast with having the temperature of the cold junction determined, at least in part, by the temperatures of the liquid container, the sensor housing and the heater for the hot junction. This operation enhances the difference between the level-dependent output signal when the sensor is submerged and the same signal when the sensor is exposed above the liquid.

More specifically, as shown in FIG 1, an oil level sensor embodying the invention comprises a tank 10 containing the oil 12 and fitted with an inlet conduit 14 and an outlet conduit 16 so that the oil can be recirculated to cool and lubricate a machine, such as a jet engine, indicated generally at 18.

A liquid sensor indicated generally at 20 is mounted in the tank 10 at a known level and connected with an electrical supply 22 and a detector 24 actuating an alarm 26. The supply, detector, and alarm are appropriately external to the tank 10.

As also shown in FIG. 1, the sensor 20 comprises a heating resistor 28 and a thermocouple indicated at 30. The thermocouple has a hot junction 32 and a cold junction 34. The junctions are preferably disposed at the same level so as to be simultaneously immersed in the oil 12. The output voltage of the sensor develops between its output terminals 31.

The hot thermocouple junction 32 is contiguous to and, as discussed below, integral with the resistor 28. The cold thermocouple junction 34 is removed from the resistor 28 and arranged to be substantially at the temperature of the fluid surrounding it. Thus when the level of the oil 12 is above the cold junction 34, as shown this junction is essentially at the temperature of the oil, and when the oil level is below the cold junction, the temperature of the junction 34 is essentially the same as that of the air above the oil.

A pair of wires 36 connect the resistor 28 with the supply 22, illustratively through a series resistor 38. The supply 22 delivers current to the resistor 28, thereby heating it, and the resistor 38 limits the current, particularly in the event of a short circuit across the resistor 28.

A pair of wires 39 apply the output voltage from the thermocouple 30 to the detector 24. The detector comprises an amplifier whose output can operate output devices such as the alarm 26 as well as control devices for correcting a low-oil condition.

During operation, current from the supply 22 heats the resistor 28, thereby heating the junction 32. When the oil immerses the sensor 20, it removes heat from the hot junction 32 and the temperature of this junction is therefore about the same as that of the oil. Thus, the temperature of the hot junction 32 and of the cold junction 34 are essentially the same. Accordingly, the thermocouple 30 develops essentially zero voltage across the two junctions, i.e. at its output terminals 30a, for application to the input terminals of the detector 24.

In the event that the level of the oil drops below the sensor 20, the cold junction 34 rapidly assumes the temperature of the environmental air. However, the air does not remove heat from the heated junction 32 as readily as the oil. Accordingly the temperature of the hot junction rapidly increases to a value substantially above that of the cold junction 34. With the junctions at different temperatures, the thermocouple develops a non-zero voltage across its junctions and applies it to the detector 24. In response to this signal, indicating that the oil level has dropped to below the known level of the sensor 20, the detector 24 actuates the alarm 26, which informs the operator of this fact. The detector output signal can also be used to initiate corrective action.

For the operation described above, the system senses the temperature of the heated junction 32 compared to the temperature of the medium surrounding this junction. With this operation, the output of the sensor is independent of changes in the temperatures of the oil and of the air above it. This temperature comparison is made by means of the cold junction 34 and, therefore, the cold junction should be at, or close to, the temperature of the medium, oil or air, surrounding the junction 32. Thus, the cold junction 34 should be in relative thermal isolation from the tank 10 and the resistor 28, both of which are generally at temperatures different from the oil and air temperatures.

Turning now to FIG. 2, the sensor 20 is constructed with a wire heating resistor 28 and a wire thermocouple 30 arranged in the form of a cage for a direct exposure to the environment. With this construction, the thermocouple junctions 32 and 34 have small thermal mass and can therefore rapidly respond to changes in the environment, i.e. between the submerged and the emerged conditions.

More particularly, the illustrated wire heating resistor 28 is a U-shaped filament or strand with legs 28a and 28b. The strand is of conductible material having sufficient resistance to apply substantial heat to the junction 32 with a nominal heating current from the supply 22 (FIG. 1). The resistor legs may be separate strands or one single continuous strand.

The thermocouple 30 is also in the form of a U-shaped strand, but comprises successively arranged sections 30a, 30b, and 30c meeting at the junctions 32 and 34, respectively. The sections 30a and 30c are of a material different from the material of the section 30b.

The junction 32 between the sections 30a and 30b is formed, and made integral with the resistor 28, by abutting the ends of the sections 30a and 30b and disposing the abutment contiguous with the resistor 28 substantially at its center. The thermocouple sections 30a and 30b are then welded together, and to the resistor 28 with a single welding operation, to form an integral structure.

With this construction, the Joule heating in the resistor 28 is applied directly to the junction 32. Only a minute portion of the voltage drop within the heating resistor 28 is applied to the thermocouple 30. That is, the thermocouple junction 32 engages the resistor 28 with a substantially point contact. Thus, little resistance of the resistor 28 is in circuit with the thermocouple between its sections 30a and 30b. This resistance is in parallel with the junction 32.

The thermocouple junction 34 between the sections 30b and 30c can also be formed by welding or other metal-to-metal bonding technique. The junction 34 is substantially midway along one leg of the U-shaped thermocouple strand, that is, substantially halfway along the strand extending between the junction 32 and a dielectric plug 42 supporting the wires. This spacing of the junction 34 enables it to be exposed to the same fluid as the junction 32. Moreover, it reduces heat transfer first between the junction 34 and the resistor 28 and, second, between the junction 34 and the plug 42. Thus, the junction 34 assumes a temperature determined primarily by the temperature of its environmental fluid.

The case for the sensor 20 comprises a cylindrical housing 44 having a perforated section 44a protectively enclosing the wire resistor 28 and the thermocouple 30. Peforations 46 through the section 44a allow the liquid or other fluid surrounding the section to pass freely through the cage to contact the heating resistor and the thermocouple junctions. The walls of the housing 44 are sufficiently spaced from the thermocouple junctions so that the temperatures of the junctions are relatively independent of the housing temperature.

The insulating plug 42 is fixed within the housing 44 adjacent the perforated section 44a. The plug has axial holes 48, 50, 52 and 54 spaced from the housing and from each other. The holes 48–54 support the strands of the resistor 28 and the thermocouple 30 within the cylindrical housing, particularly against axial movement. The holes in the illustrated plug 42 are uniformly spaced apart as at the corners of a square. The diagonally opposite holes 50 and 52 receive the strands forming the thermocouple and the other pair of diagonally opposite holes 48 and 54 receive the strands of the heater 28.

The two pairs of insulated wires 36 and 39 enter the housing 44 at its end 44b remote from the perforated end 44a and are secured to the housing with an insulating spacer 63. The wires extend beyond the spacer 63 for connection to the resistor and thermocouple strands. Thus, as shown, the wire 36a connects to the strand forming the heater leg 28a. These connections can be brazed or hard, i.e. silver, soldered.

The sensor case also includes a mounting 56 comprising a flange 58 for connection to the tank 10 (FIG. 1) and a spacer 60 interconnecting the flange and the housing 44. The spacer 60 supports the housing with the thermocouple junctions spaced from the walls of the tank 10 to ensure that the fluid contacting them is at substantially the same temperature as the main body of fluid in the tank 10, rather than at the temperature of the tank itself.

With this construction, the thermocouple junctions are firmly supported at a known level in the tank 10 and protected from debris in the oil. The junctions and the heating resistor are relatively unaffected by mechanical shock and high pressures, and can operate over wide temperature ranges. Moreover, the junctions are relatively thermally isolated from the tank and the sensor case, but are exposed for efficient heat exchange with the fluid in which they are immersed, be it a gas or a liquid. As a result, the temperature of the cold junction 34 is essentially exclusively dependent on the temperature of its environmental fluid and the temperature of the hot junction is determined essentially by its environmental fluid and by the heating of the resistor 28. Moreover, the junctions have small mass and hence respond rapidly to changes in the temperature and nature of their environmental fluid.

An oil-level sensing system constructed as described above with D.C. heater supply 22 preferably uses a detector 24 incorporating a magnetic amplifier that drives a switching device such as a silicon controlled rectifier to develop the low-oil alarm signal. The magnetic amplifier is desirable because of its reliability, temperature stability and low input impedance.

In conjunction with the sensor 20, such a detector 24 developed an alarm when the sensor output voltage increased to 0.6 millivolt, and removed the alarm when the sensor voltage dropped to 0.36 millivolt. Such a voltage difference corresponds to a relatively small change in oil level from above to below the junctions of the sensor.

The sensor of FIGS. 1 and 2 can have an alternative construction in which the amplitude of the heater voltage appearing at the thermocouple output terminals is even less than with the construction detailed above with reference to FIG. 2. This construction will now be described with reference to FIG. 3, where elements corresponding to those in FIGS. 1 and 2 are designated with the same reference numerals, followed by primes. Thus, the FIG. 3 sensor is designated 20'.

The heating resistor 28' is shown between heater terminals 28c and 28d, and the thermocouple 30', comprising the successively-connected sections 30a', 30b', and 30c', has output terminals 31'. The cold thermocouple junction 34' is at the connection of sections 30c' and 30b' and the hot junction 32' is between sections 30a' and 30b'.

In addition, a bridging conductor 64 (shown enlarged for clarity) extends for a short distance, illustratively several thousandths of an inch, between the thermocouple junction 32' and the heating resistor 28'. The bridging conductor 64 is joined at one end to the resistor 28' with a metal-to-metal connection and is welded at its other end to the thermocouple sections 30a' and 30b'.

However, the bridging conductor 64 serves to diminish to a negligible value the heater voltage between the thermocouple sections 30a' and 30b'. This can be explained in the following manner. At the connection between the resistor 28' and the bridging conductor 64, heating current in the resistor 28' develops a voltage between the opposed sides 64a and 64b of the bridging conductor. This voltage, due to heater supply, decreases in amplitude along the length of the bridging conductor to a minimum value at the thermocouple junction 32'. Hence, the heater voltage applied to the thermocouple 30' is very small. Correspondingly, the level-dependent voltage output from the sensor 20' can generally be utilized directly, without any apparatus to distinguish it from the negligible amount of heater voltage appearing at the thermocouple output terminals.

A further feature of the sensor 20' is that the resistor 28' may be made of material having a higher resistivity than the heating resistor in the FIG. 2 construction. This reduces the current amplitude required from the supply 22, making possible a reduction in the size, weight and cost of the supply.

FIG. 4 shows a thermoelectric sensor 66 employing both Peltier and Joule heating for a sensing junction 68. The sensor has a sensing circuit indicated at 70 and a heating circuit indicated generally at 72. The sensing circuit 70 comprises the sensing junction 68 and a cold junction 74 and is connected between terminals 76 and 78. Similarly, the heating circuit 72 comprises a hot junction 80 and a cold junction 82 and is connected between terminals 84 and 86.

More particularly, the illustrated sensor 68 has a resistive conductive strand 88 that extends between the terminals 84 and 78. Adjacent its midpoint, the strand 88 is welded to a strand 90 thereby forming the junction 68. Closely spaced from the junction 68, the strand 88 is welded to a strand 92; this connection forms the junction 80. The strands 90 and 92 are of materials different from the strand 88. However, for added Joule heating, the strand 92 can also be of resistive material.

A strand 94 is welded between the strand 92 and terminal 86 to form the junction 82. Similarly, a strand 96 is welded at the junction 74 to the strand 90 to form the terminal 76. The strand 94 is of a different material from strand 92 and strands 90 and 96 are also of different materials from each other; the strands 96 and 94 may be of the same material as the strand 88.

A source 98 of direct voltage is connected between the terminals 84 and 86, with the terminal 84 being positive, to operate the heating circuit 72. An output device, illustratively a meter 100, is connected between the sensing circuit terminals 76 and 78. The direct current from the source 98 passes through the portion of the strand 88 in heater circuit 72 and through the strands 92 and 94 therein. Due to the resistance of these strands, the source current produces Joule heating in them. In addition, the materials of the strands 88, 92 and 94 are such that the source current having the indicated polarity through the junctions 80 and 82 transfers heat from the junction 82 to the junction 80 according to the Peltier effect.

The bridging section 88a in the strand 88 between the junctions 80 and 68 conducts the heat developed in the heating circuit 72 to the sensing circuit 70, and primarily to the junction 68 therein. As a result, when the sensor 66 is exposed to a fluid having low thermal diffusivity, such as air, the sensing junction 68 will be at a substantially higher temperature than the junction 74. As a result, a thermoelectric voltage develops between the sensing circuit terminals 76 and 78. The output device 100 responds to this voltage.

As with the bridging conductor 64 in FIG. 3, the bridging section 88a of the sensor 66 is preferably sufficiently short to deliver to the junction 68 a substantial portion of the heat flowing into the junction 80. It should also be understood that the junctions 68 and 80 can be formed integral with each other, i.e. that the sensor 66 can be constructed without the bridging section 88a. With the latter arrangement, however, the amount of voltage coupled from the source 98 into the sensing circuit 70 generally more than offsets the increase in sensing circuit output voltage due to closer thermal coupling.

A comparison of Peltier heating with Joule heating shows that with certain materials having high thermal electromotive forces, the Peltier heating is considerably more efficient, i.e., it produces a larger increase in temperature per unit of electrical input power than does Joule heating. In fact, with one-quarter ampere from the source 98, Peltier heating more than four times as great as the Joule heating has been achieved.

With the illustrated sensor 66, having resistive strands in the heating circuit 72, the Joule heating elements are in series with the Peltier heating elements. This arrangement is intended for use with a source 98 having limited current capacity but a higher output voltage than required for only the Peltier heating.

On the other hand, where the source 98 can directly match to the resistance of the Peltier heating junctions 80 and 82, i.e. where the source has a high current capacity and a relatively low voltage, a maximum heating efficiency can generally be realized by utilizing only Peltier heating, i.e., with a sensor in which the thermoelectric heating circuit 72 employs highly conductive strands.

Where two or more fluid levels are to be monitored, as in separate containers or for different levels within the same container, the sensors can be arranged as in FIG. 5 for efficient operation with a source of relatively limited current capacity.

Referring to this figure, two sensors 102 and 104, each preferably identical to the sensor 66 described above with reference to FIG. 4, have heating circuits 106 and 108 and sensing circuits 110 and 112, respectively. The heating circuits of the sensors are in series with each other and in series with the source 98. A dropping resistor 114 can be provided in series with the source to match it to the electrical requirements of the sensor heating circuits.

The sensor 102 has an output device 120 connected to its sensing circuit 110 and an output device 122 is connected to the sensing circuit 112 of the sensor 104. With this arrangement, while the heating circuits are interconnected, the sensing circuits nevertheless operate independent from each other.

As also shown in FIG. 5, a resistor 116 is connected in parallel with the heating circuit of the sensor 102 and, similarly, a resistor 118 is in parallel with the heating circuit of the sensor 104. Each resistor protects the other sensor in the event that the sensor to which they are connected burns out. More particularly, in the event that the heating circuit 106 burns out and develops an open circuit, the resistor 116 in parallel with it will continue to supply operating current to the sensor 104. The resistance of each resistor 116 and 118 is relatively small compared to that of resistor 114 and yet is sufficiently larger than the sensor heating circuit resistance so as not to draw excessive current.

As shown in FIG. 2 for the sensor 20, the sensors 66, 102 and 104 (FIGS. 4 and 5) incorporating Peltier heating should be employed in such a manner that they are isolated from air currents or other gas currents when emmersed, i.e. above the liquid level being monitored. This is because such currents can remove sufficient heat from the heated sensing circuit junction to place it close to the temperature of the cold junction. Accordingly, the entire sensor is generally enclosed in a shield, such as the FIG. 2 housing 44, that makes it possible for the sensing circuit junctions to directly contact the environmental fluid but still protects the sensing junctions from gas currents in the chamber interior.

The invention described above thus provides thermoelectric sensors that utilize the different thermal diffusivities of fluids to develop information indicating whether a stored liquid is above or below the sensor. The sensors develop this information in an electrical signal that is relatively free of noise components resulting from the electrical excitation. Moreover, the sensors employ highly efficient Joule and Peltier heating, both separately and in combination, for the thermoelectric sensing junction. These features make it possible for the sensors to be constructed with relative simplicity and to operate with little additional equipment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A transducer for determining whether a contained fluid is above or below a known level, said transducer comprising
    A. a support housing having a perforate wall forming a cavity section and having a base section at one end of the cavity section,
    B. a resistive wire supported by said housing with at least a portion thereof openly exposed in said cavity section to environmental fluid,
    C. a thermocouple
        (1) comprising first, second and third successively connected conductive strands forming a first thermocouple junction between said first and second strands and a second thermocouple junction between said second and third strands.
        (2) said thermocouple being supported by said housing from said base section with said junctions disposed within said cavity section openly spaced from the housing walls and relatively thermally isolated from said housing and openly exposed to substantially the same level of environmental fluid,
        (3) at least one of said first and second strands being connected with said resistive wire proximate to said first thermocouple junction,
        (4) said second junction being removed from said resistive wire to have relatively low heat transfer therewith.

2. The sensor defined in claim 1 in which a weld connection joins both said first and second strands to said resistive wire.

3. A sensor for determining whether a stored liquid is at a known level in a container, said sensor comprising in combination A. a housing having a liquid-pervious section substantially enclosing a sensor cavity,
B. a mounting
   (1) attached to said housing and attachable to said container,
   (2) for disposing said cavity section of said housing spaced into said liquid from said container,
C. a dielectric member secured in said housing adjacent said cavity section,
D. first and second pairs of electrical conducting means extending into said housing insulated from each other,
E. a U-shaped heater strand
   (1) having a resistive section at the base of said U-shape, and
   (2) having leg sections at either end of said resistive section and connected between said first pair of conducting means,
   (3) said leg sections supporting said resistive section in said cavity from said dielectric member, and
F. a U-shaped thermocouple strand
   (1) having a first section forming a leg and a portion of the base of its U-shape and extending from said dielectric member to said resistive section,
   (2) having a second section joined at one end thereof to said first section and said resistive section to form a first thermocouple junction integral with said resistive section, and
   (3) having a third section connected to the other end of said second section to form a second thermocouple junction,
   (4) said second and third sections forming the other leg of the U-shape of said thermocouple strand,
   (5) the material of said second thermocouple strand section being different from the materials of said first and third sections, and
   (6) said first and third thermocouple sections being supported within said cavity at their ends remote from said second section by said insulating member and being connected between said second pair of connecting means.

4. The sensor defined in claim 3 in which the thermocouple junction between said first and second sections is made integral with said resistive section by welding the abutting ends of said first and second sections and said resistive section together.

5. The sensor defined in claim 3 further comprising
A. a current limiting resistor.
B. a current supply in series with said resistor and with said first pair of conducting means,
C. a detector connected with said second pair of connecting means to receive the output voltage from said thermocouple, and
D. output alarm means operatively connected with said detector.

6. A fluid level transducer comprising in combination
A. a resistive heating wire,
B. a thermocouple having first and second thermocouple junctions formed by the junctions of first, second and third successively-connected conductive strands with said second strand being of a material different from said first and third strands, and
C. a heat-conducting bridging conductor
   (1) connected to at least one of said first and second strands in the region of said first thermocouple junction, and
   (2) connected at its end remote from said thermocouple to said resistive wire,
   (3) each of said connections being made with a juncture having relatively low thermal resistance from said conductor to the element connected thereto, and
D. a housing
   (1) having perforate walls forming a chamber and
   (2) supporting said heating wire and said thermocouple in said chamber spaced from the walls thereof and in a considerably closer heat exchange relation with their environmental fluid than with both said housing and the container of said fluid.

7. The transducer defined in claim 6 in which said second thermocouple junction is spaced from said resistive wire and from said bridging conductor to be substantially thermally isolated from said resistive wire and is substantially thermally isolated from and housing.

8. The transducer defined in claim 7 in which
A. said bridging conductor has a short length, and connects to said thermocouple at said first thermocouple junction,
B. a weld connection at said first junction joins together said bridging conductor, said first strand and said second strand.

9. The combination comprising
A. means forming a first pair of terminals,
B. a first thermoelectric circuit connected between said first pair of terminals and having a first hot junction and a first cold junction,
C. means forming a second pair of terminals,
D. a second thermoelectric circuit connected between said second pair of terminals and having a second hot junction and a second cold junction,
E. means forming between said first and second hot junctions a thermally conductive path having a considerably higher thermal conduction than the paths in either said first or second thermoelectric circuits between said hot and cold junctions thereof, and
F. a shield adjacent said first and second thermoelectric circuits, said shield
   (1) freely admitting environmental fluid directly to contact said second junctions, and
   (2) restricting the flow of fluid by said second junctions in response to currents in the fluid.

10. The combination comprising
A. means forming a first pair of terminals,
B. a first thermoelectric circuit connected between said first pair of terminals and having a first hot junction and a first cold junction,
C. a relatively highly resistive electrical conductor in series in said first circuit with an end thereof proximate to and in high heat transfer relation with said first hot junction,
D. a second thermoelectric circuit connected between said second pair of terminals and having a second hot junction and a second cold junction, and
E. means forming between said first and second hot junctions a thermally conductive path having a considerably higher thermal conduction than the path in either said first or second thermoelectric circuits between said hot and cold junctions thereof.

11. A fluid storage system comprising
A. a fluid container having normally upstanding walls,
B. means forming a first pair of terminals,
C. means forming a second pair of terminals,
D. a thermoelectric Peltier heating circuit comprising first, second and third conductor portions successively connected in series between said first pair of terminals with said second conductor portion being of a different material from said first and third conductor portions,
E. a thermoelectric sensing circuit comprising fourth, fifth and sixth conductor portions successively connected in series between said second pair of terminals with said fifth conductor portion being of a different material from said fourth and sixth conductor portions, F. means forming a heat conductive path between the connection of said first portion and said second portion and the connection between said fourth portion and said fifth portion, and G. a support
   (1) mounted within said container,
   (2) supporting said heating circuit and said sensing circuit at a known level along said upstanding walls and spaced into the interior of said container from said walls thereof.

12. Apparatus according to claim 11 in which said means forming said heat conductive path couples at least part of the electrical path between said first and second conductor portions in parallel with the electrical path between said fourth and fifth conductor portions.

13. Apparatus according to claim 11 further comprising
A. a direct voltage electrical supply connected with said first pair of terminals with the supply polarity arranged to produce a flow of Peltier heat from the connection between said second and third conductor portions to the connection between said first and second conductor portions, and
B. a signal detector connected to said second pair of terminals and responsive to the voltage said thermoelectric sensing circuit develops between said second pair of terminals.

14. Apparatus according to claim 11 in which at least one of said first and second conductor portions is of an electrically resistive material.

15. Apparatus according to claim 11 in which an electrically resistive strand has three successive segments respectively forming said first conductive portion, said heat conductive means and said fourth conductor portion.

16. A transducer comprising in combination
A. a first electrically conductive strand of a first material forming at its ends first and second terminal means,
B. second and third electrically conductive strands each being of a material different from said first material and each being connected to said first strand intermediate its ends,
   (1) at least one of said first and second strands being of an electrically resistive material,
C. a fourth electrically conductive strand of material different from the material of said second strand and connected to the end of said second strand remote from said first strand and forming at its end remote from said second strand a third terminal means,
D. a fifth electrically conductive strand of material different from the material of said third strand and connected at one end to the end of said third strand remote from said first strand and forming at its other end a fourth terminal means.

17. A transducer according to claim 16 in which said second strand is welded to said first and fourth strands, and said third strand is welded to said first and fifth strands.

18. A transducer according to claim 16 further comprising a housing
A. having a liquid-pervious section substantially enclosing a sensor cavity and forming a fluid-current shield around said cavity, and
B. means mounting said strands with respect to said housing with said connections between said strands being within said cavity.

19. In a measuring circuit for connection with a source of direct voltage, the combination comprising
A. a first transducer
   (1) having means forming first and second pairs of terminals,
   (2) having a first thermoelectric circuit connected between said first pair of terminals and having a first hot junction and a first cold junction,
   (3) having a second thermoelectric circuit connected between said second pair of terminals and having a second hot junction and a second cold junction, and
   (4) means forming a heat conductive path between said first and second hot junctions,
B. a second transducer having
   (1) third and fourth pairs of terminals,
   (2) a third thermoelectric circuit connected between said third pair of terminals and having a third hot junction and a third cold junction,
   (3) a fourth thermoelectric circuit connected between said fourth pair of terminals and having a fourth hot junction and a fourth cold junction, and
   (4) means forming a heat conductive path between said third and fourth hot junctions,
   (5) said third pair of terminals being in series with said first pair of terminals in such a manner that said first cold junction is in series between said first and third hot junctions,
C. a first resistive element connected between said first pair of terminals,
   (1) said first element having a resistance substantially greater than the resistance of said first circuit between said third terminals. and
D. a second resistance element connected between said third pair of terminals,
   (1) said second element having a resistance substantially greater than the resistance of said third circuit between said third terminals.

20. A measuring circuit according to claim 19 further comprising a direct voltage source in series with said first and third pairs of terminals and arranged to apply to each of said first and third hot junctions a voltage that is positive with respect to the voltage at said first and third cold junctions, respectively.

21. A measuring circuit according to claim 20 further comprising voltage responsive output means in circuit with each of said second and fourth pairs of terminals.

22. Apparatus for determining whether a stored liquid is above a known level in a container, said apparatus comprising
A. a first thermocouple junction formed by first and second different electrically conductive members,
B. a second thermocouple junction in series with said first junction,
C. a heated member
   (1) integral with said first junction at a contact
      (a) at which said heated member adjoins directly to at least one of said first and second conductive members and
      (b) such that the electrical path between said first and second conductive members includes a portion of said heated member in parallel with said first junction,
   (2) arranged to maintain said first junction at substantially the same temperature as the portion of said heated member that is integral with the junction, and
   (3) directly exposed to and in a relatively close heat exchange relation with said liquid when the liquid is above said known level,
D. support means
   (1) supporting said heated member in said container
      (a) for immersion in said liquid when the liquid rises above said known level and
      (b) in relative thermal isolation from the walls of said container, and
   (2) supporting said first and second thermocouple junctions
      (a) in relatively close heat exchange relation with said liquid when the liquid is above said level, and with the fluid above said liquid when the liquid is below said level, and
    (b) in relatively high thermal isolation from said housing and said container so that the temperatures of said junctions are effectively independent of the temperatures of said housing and of said container, and
E. means for supplying heat to said heated member at a substantially constant rate, whereby
    (1) when the environmental fluid of said member has relatively low thermal diffusivity, the temperatures of said member and of said first junction are higher than that of the fluid, and
    (2) when said liquid immerses said member, the temperatures of the member and of said first junction change to be more nearly equal to the temperature of the liquid.

23. Apparatus according to claim 22
A. further comprising a liquid container carrying said support means to dispose said junctions and said heated member at said known level therein,
B. further comprising an electrical signal detector connected in series with said first and second junctions, and
C. in which said heat-supplying means includes an electrical heater and a direct voltage electrical supply connected to apply heating current to said electrical heater.

24. Apparatus according to claim 22 in which
A. said heated member comprises a resistive wire,
B. three conductive strands in series succession form said first and second thermoelectric junctions with first and second of said strands being said first and second conductive members,
C. said first thermocouple junction is integral with said resistive wire at a weld connection and
D. said resistive wire and said first and third strands
    (1) have end sections supportingly engaged by said support means, and
    (2) have said first and second junctions and said weld connection removed from the engagement of said end sections with said support means by sufficient distances therealong to provide said thermal isolation from said container and from said housing, and
    (3) are devoid of additional support elements intermediate (a) the engagement of said end sections with said support means and (b) said junctions and weld connection.

25. Apparatus according to claim 22 in which
A. three conductive strands in series succession form said first and second thermoelectric junctions with first and second of said strands being said first and second conductive members,
B. said heated member comprises an electrically heated wire and an electrically conductive bridge conductor connected between said first thermocouple junction and said heated wire,
C. said heated wire and said strands have
    (1) end sections supportingly engaged by said support means, and
    (2) said first and second junctions and said bridge conductor-junction connection removed from the engagement of said end sections with said support means by sufficient distances therealong to provide said thermal isolation from said container and from said housing, and
    (3) are devoid of additional support elements intermediate the (a) engagement of said end sections with said support means and (b) said junctions and said bridge conductor-junction connection.

26. Apparatus according to claim 22 in which
A. said heated member comprises a Peltier heat pump having a hot junction in close heat exchange relation with said first junction, and
B. said heat supplying means includes a direct voltage source connected with said Peltier heat pump.

27. Apparatus for determining whether a stored liquid is above a known level in a container, said apparatus comprising
A. a first thermocouple junction formed by first and second different electrically conductive members,
B. a second thermocouple junction in series with said first junction,
C. an electrically heated member
    (1) integral with at least one of said first and second conductive members closely adjacent said first junction,
    (2) arranged to maintain said first junction at substantially the same temperature as the portion of said heated member that is integral with the junction, and
    (3) directly exposed to and in a relatively close heat exchange relation with said liquid when the liquid is above said known level,
D. support means
    (1) supporting said heated member in said container
        (a) for immersion in said liquid when the liquid rises above said known level and
        (b) arranged in relative thermal isolation from the walls of said container, and
    (2) supporting said first and second thermocouple junctions
        (a) arranged in relatively close heat exchange relation
            (i) with said liquid when the liquid is above said level, and
            (ii) when the fluid above said liquid when the liquid is below said level, and
        (b) arranged in relatively high thermal isolation from said container so that the temperatures of said junctions and of said heated member are effectively independent of the temperature of said container, and
    (3) said support means forming a shield that relatively freely admits fluid in said container to the immediate environment of said heated member and restricts the flow of fluid in said container about said heated member due to currents within the fluid.

References Cited by the Examiner
UNITED STATES PATENTS

| | | | |
|---|---|---|---|
| 1,291,409 | 1/1919 | Chubb et al. | 73—17 |
| 2,612,779 | 10/1952 | Mulford | 73—359 |
| 2,702,476 | 2/1955 | DeBoisblanc | 73—275 |
| 2,849,880 | 9/1958 | Obermaier | 73—204 |
| 2,926,299 | 2/1960 | Rogoff. | |
| 3,030,806 | 4/1962 | Davis | 73—204 |
| 3,118,136 | 1/1964 | Steele | 73—295 X |
| 3,204,462 | 9/1965 | Horne | 73—359 |

LOUIS R. PRINCE, *Primary Examiner.*
S. C. SWISHER, F. H. THOMPSON,
*Assistant Examiners.*